United States Patent
Liang

(10) Patent No.: US 11,686,101 B2
(45) Date of Patent: Jun. 27, 2023

(54) ELECTRIC AWNING STRUCTURE

(71) Applicant: YUYANG PC INDUSTRIAL CO., LTD., Lukang Township, Changhua County (TW)

(72) Inventor: Chen-Feng Liang, Lukang Township, Changhua County (TW)

(73) Assignee: YU YANG INDUSTRIAL CO., LTD., Changhua County (TW)

( * ) Notice: Subject to any disclaimer, the term of this patent is extended or adjusted under 35 U.S.C. 154(b) by 200 days.

(21) Appl. No.: 17/160,306

(22) Filed: Jan. 27, 2021

(65) Prior Publication Data

US 2022/0235555 A1    Jul. 28, 2022

(51) Int. Cl.
*E04F 10/10* (2006.01)
*H02S 40/38* (2014.01)
*H02S 20/10* (2014.01)

(52) U.S. Cl.
CPC .............. *E04F 10/10* (2013.01); *H02S 20/10* (2014.12); *H02S 40/38* (2014.12)

(58) Field of Classification Search
CPC ...................................................... E04F 10/10
See application file for complete search history.

(56) References Cited

U.S. PATENT DOCUMENTS

| 5,433,259 | A  | * | 7/1995  | Faludy    | H02S 30/20    |
|           |    |   |         |           | 160/67        |
| 5,669,179 | A  | * | 9/1997  | Hanlon    | E06B 7/086    |
|           |    |   |         |           | 49/82.1       |
| 9,422,715 | B1 | * | 8/2016  | Selzer    | E04D 11/00    |
| 10,858,840| B2 | * | 12/2020 | Ji        | E06B 7/086    |
| 10,988,926| B2 | * | 4/2021  | Mitchell  | E04B 7/163    |
| 11,008,754| B2 | * | 5/2021  | Partridge | E04B 1/941    |
| 11,060,296| B2 | * | 7/2021  | Castel    | E04F 10/0648  |
| 11,149,438| B2 | * | 10/2021 | Torman    | E04F 10/10    |
| 2016/0177575| A1| * | 6/2016  | Ivic      | E04F 10/08    |
|           |    |   |         |           | 52/302.1      |

FOREIGN PATENT DOCUMENTS

| EP | 3015618 A1 | 5/2016 |
| EP | 3348741 A1 | 7/2018 |

* cited by examiner

*Primary Examiner* — Beth A Stephan

(57) ABSTRACT

An electric awning structure has a supporting structure, a plurality of louvers, a plurality of louver securing members and a plurality of driving plates. The supporting structure has the plurality of standing columns, and at least four crossbeams to form a frame above the standing columns. The supporting structure is equipped with at least one power storage device and a control device, and the louver securing members are secured to the louvers so that the louvers are pivoted between the two crossbeams. The plurality of louver securing members are connected to the driving plate, and each the driving plate is connected to each driving member. The solar panel is connected to the power storage device which is connected to the control device, and the control device is connected to a pulling device set on the crossbeam and having a pull bar connected to the driving member.

10 Claims, 8 Drawing Sheets

ELECTRIC AWNING STRUCTURE

BACKGROUND OF INVENTION

Field of Invention

The present invention relates to an electric awning structure, and more particularly to an electric awning structure powered by solar panels.

Description of Related Art

Accordingly, the first type of known awning structure, as disclosed in EP patent 3015618A1, comprises a support structure provided with at least two lateral beams that are parallel to each other and side-by-side, each longitudinally extended along a corresponding first extension direction; a plurality of covering blades arranged one after the other according to said first extension direction, each of such covering blades extended along a second extension direction substantially orthogonal to said first extension direction, and provided with two opposite ends associated with said respective lateral beams; said covering blades being movable between a closure position, in which said covering blades are arranged partially superimposed, each over the next, covering an underlying ground surface, and at least one open position, in which said covering blades are arranged each spaced from the next, delimiting passage openings between them. Said awning structure further comprises: movement means actuatable to slide along at least one of said lateral beams between a retreated position and an advanced position; a plurality of orientation guides fixed along at least one of said lateral beams at the ends of said plurality of covering blades, each of such orientation guides at least partially extended along a path which is arranged on a plane substantially orthogonal to the second extension directions of said covering blades and is extended between one first part closer to said movement means and at least one second part further from said movement means.

Alternatively, the second type of known awning structure, as disclosed in the EP Patent 3,348,741 A1, comprises a supporting structure provided with at least two substantially parallel beams, between which a plurality of elongated and mutually juxtaposed orientable slats are interposed, each slat having the mutually opposite ends articulated about respective rotation pivots which are substantially aligned and associated with respective bars that can slide along said beams, means of actuation with alternating translation of said bars along said beams for a functional stroke and means of moving said slats between a closed configuration, in which they are arranged partially superimposed in pairs to define a continuous covering surface, and a fully open configuration, in which they are spaced apart in pairs to define a plurality of slots for the passage of light and/or air, passing through a plurality of partially open configurations, the closed configuration and the fully open configuration being assumed by said slats at the end positions of said bars along said functional stroke, characterized in that said movement means comprise, for each slat, at least one lever which is articulated to one end of said slat and to the beam that is adjacent thereto, respectively by way of a first articulation pivot and a second articulation pivot which are substantially parallel to the rotation pivots of said slat.

The third type of awning structure in the prior art, as shown in FIGS. 8 to 10, mainly has the plurality of louvers 50, a plurality of louver securing members 60, and at least one driving structure 70. One end of the louver 50 is provided with an insertion portion 51, and a locking portion 52 is provided at the middle section of the bottom surface of the louver 50. The louver securing member 60 has a fixed end 61, a locking end 62, and an inlay groove 63 near the fixed end 61. The locking end 62 is provided with a locking groove 621, and a locking point 622 is formed by the locking groove 621. The driving structure 70 has a driving plate 71, a linkage rod 72 and a control device 73. The connecting part 51 of the louver 50 is inserted into the inlay groove 63 of the louver securing member 60, the locking part 52 at the middle section of the louver 50 engages with the locking groove 621 of the louver securing member 60, and the locking point 622 of the locking end 62 locks the locking part 52 of the louver 50, and finally the fixed end 61 of the louver securing member 60 is connected to the driving plate 71 so that the louver 50 is fixed to the driving structure 70. Therefore, the control device 73 of the driving structure 70 moves the linkage rod 72 to drives the driving plate 71 to control the louver 50 to open or close.

However, the above conventional structures still have the following problems in actual use: The first and second conventional structures are both connected to the louver by the levers, and then the levers are connected to the supporting structure through the lever pivots. When the length of the louver is too long, its midsection will sag due to weight, which will deform the louver. Furthermore, in the third conventional structure, the louver are embedded on to the louver securing member, and the louver securing member is pivotally assembled on the supporting structure, which is easy to assemble, but the strength of the embedded structure is poor causing the louver to fall off easily.

Therefore, it is desirable to provide an electric awning structure to mitigate and/or obviate the aforementioned problems.

SUMMARY OF INVENTION

An objective of present invention is to provide an electric awning structure, which is capable of improving the above-mention problems.

In order to achieve the above mentioned objective, An electric awning structure has a supporting structure, a plurality of louvers, a plurality of louver securing members and a plurality of driving plates. The supporting structure has the plurality of standing columns, and at least four crossbeams to form a frame above the standing columns. The supporting structure is equipped with at least one power storage device and a control device, and the louver securing members are secured to the louvers so that the louvers are pivoted between the two crossbeams. The plurality of louver securing members are connected to the driving plate, and each the driving plate is connected to each driving member. The solar panel is connected to the power storage device which is connected to the control device, and the control device is connected to a pulling device set on the crossbeam and having a pull bar connected to the driving member.

Other objects, advantages, and novel features of invention will become more apparent from the following detailed description when taken in conjunction with the accompanying drawings.

DETAILED DESCRIPTION OF PREFERRED EMBODIMENT

Figure 1:
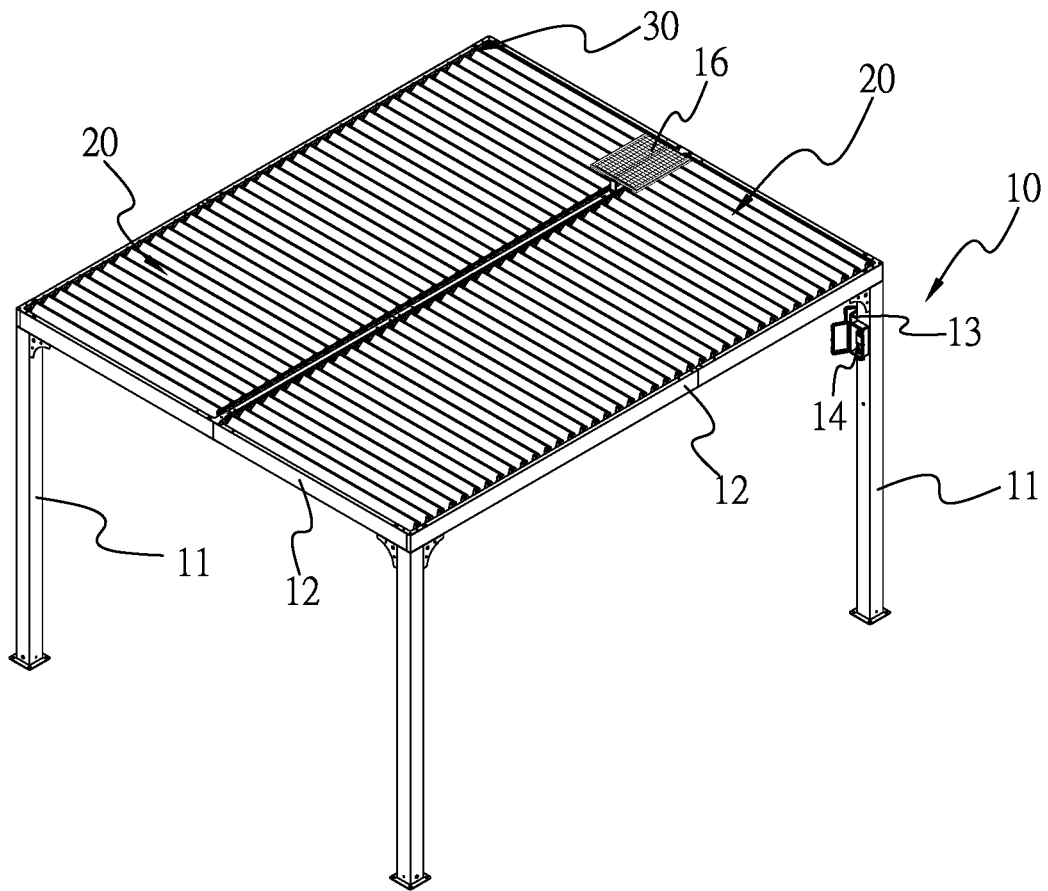
FIG. 1 is the three-dimensional combination diagram of a preferred embodiment according to the present invention.
Figure 2:
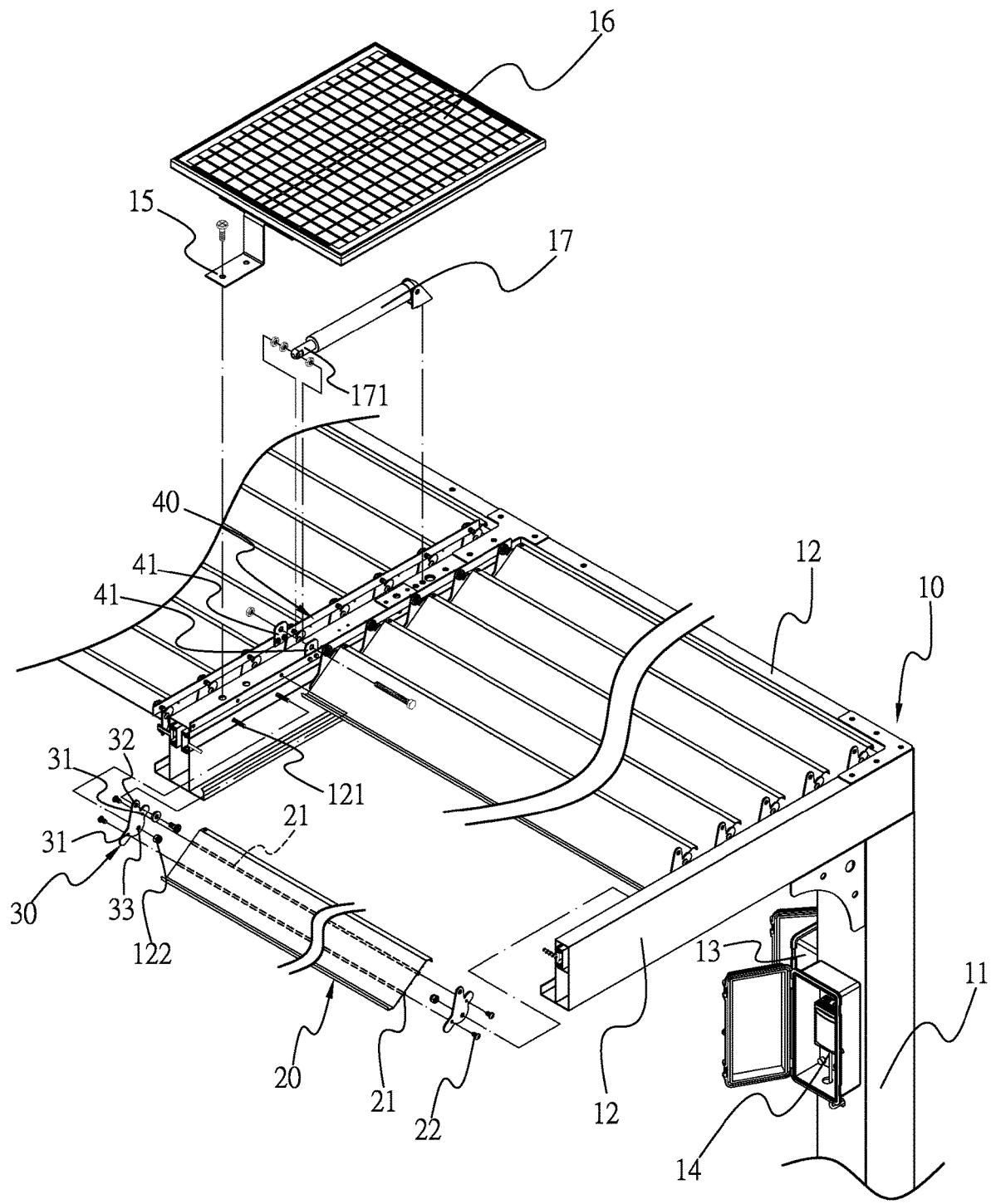
FIG. 2 is a three-dimensional exploded view of the preferred embodiment according to the present invention.
Figure 3:
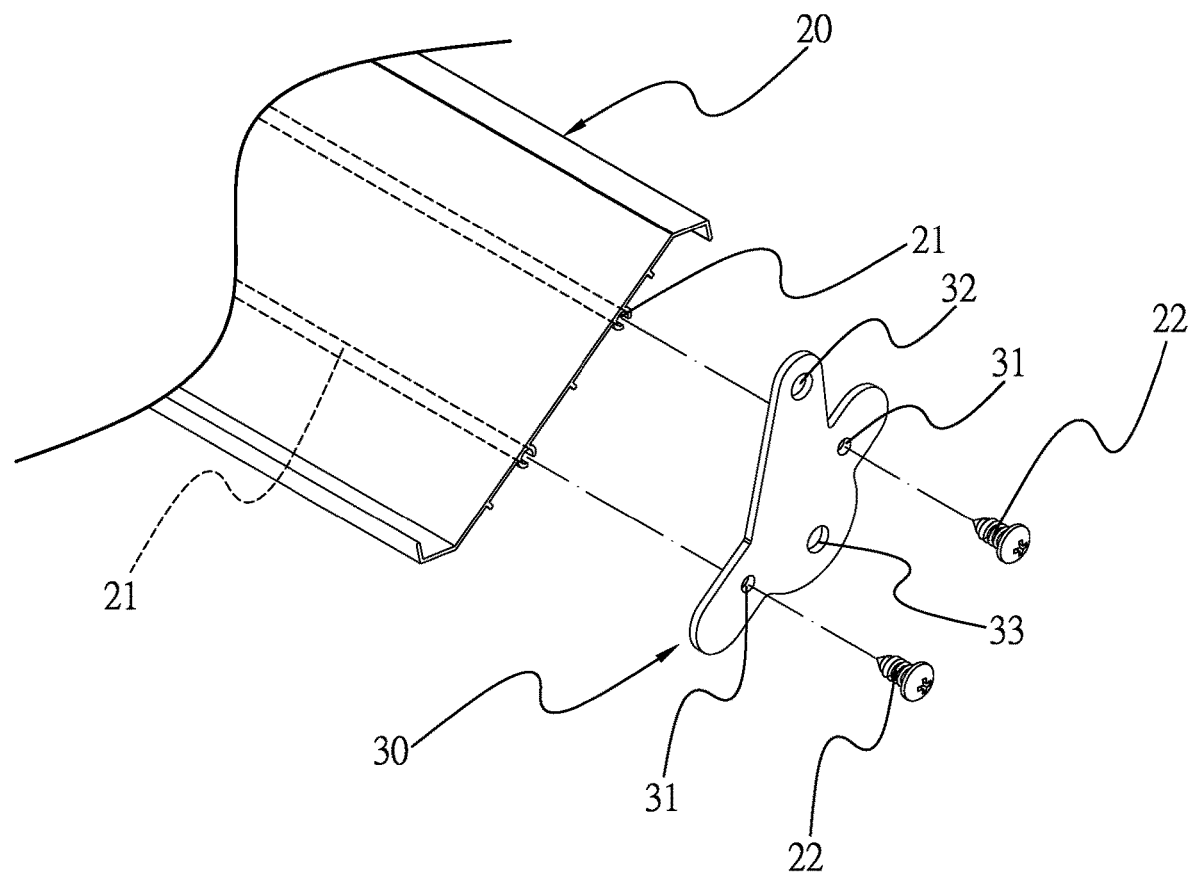
FIG. 3 is a schematic drawing of the combination of the louver and the louver securing member of the preferred embodiment according to the present invention.
Figure 4:
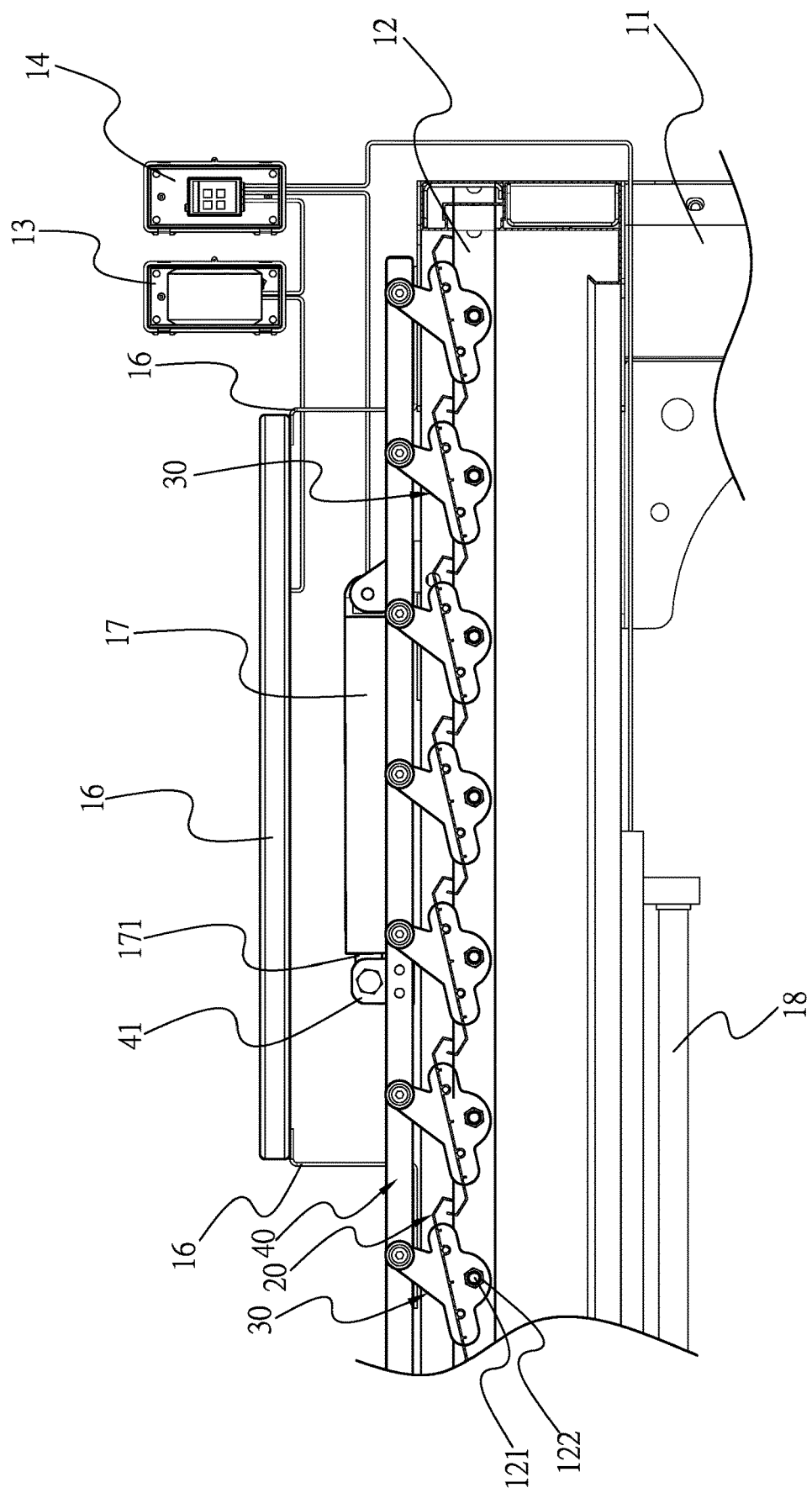
FIG. 4 is a drawing showing the power storage device and the control device connecting to the solar panel and the pulling device according to the present invention.

Please refer to FIGS. 1 to 4. An electric awning structure comprises: a supporting structure 10, a plurality of louvers 20, a plurality of louver securing members 30 and a plurality of driving plates 40. The supporting structure 10 has a plurality of standing columns 11, and at least four crossbeams 12 forming a frame mounted above the plurality of standing columns 11. The supporting structure 10 comprises at least one power storage device 13 and a control device 14. Each of two facing sides of each two crossbeams 12 respectively have a plurality of locking members 121, and two ends of each louver 20 respectively has at least two securing apertures 21 provided with a corresponding screw 22. A front end and rear end of each louver securing member 30 respectively has a through aperture 31, and an upper end and lower end of each louver securing member 31 respectively has a through hole 32 and an insertion hole 33. The screw 22 passes through each through aperture 31 of the louver securing member 30 to lock the louver securing member 30 with the securing aperture 21 of the louver 20. The insertion hole 33 of each louver securing member 30 accepts a respective locking member 121 of the crossbeam 12, and a plurality of screwing members 122 engages with the locking member 121 to assemble each louver 20 between two of the crossbeams 12. The through holes 32 of the plurality of louver securing member 30 are connected to the driving plates 40, and each driving plate 40 is connected to a driving member 41. At least one solar panel 16 is installed on the crossbeam 13 via a bracket 15, the solar panel 16 is electrically connected to a power storage device 13 connected 20 to a control device 14, and the control device 14 is connected to a pulling device 17. The pulling device 17 is mounted on the crossbeam and has a pull bar 171, the pull bar 171 is connected to the driving member 41, and the control device 14 controls movement of the pull bar 141 to drive the driving plates 40 to close or open the louvers 20.

Figure 5:
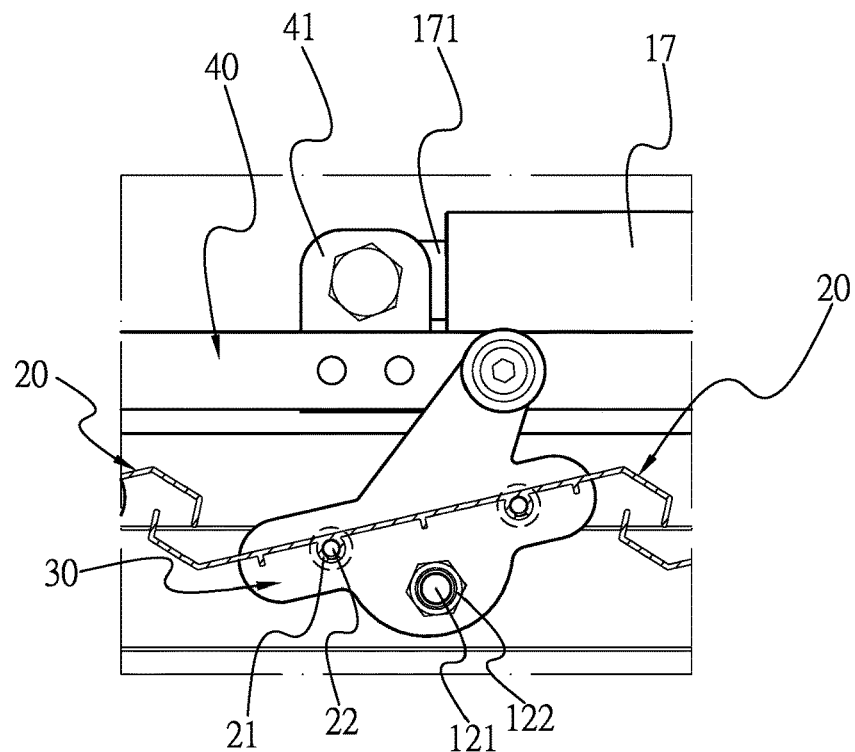
FIG. 5 shows the pull bar of the pulling device being pulled to close the louver according to the present invention.
Figure 6:
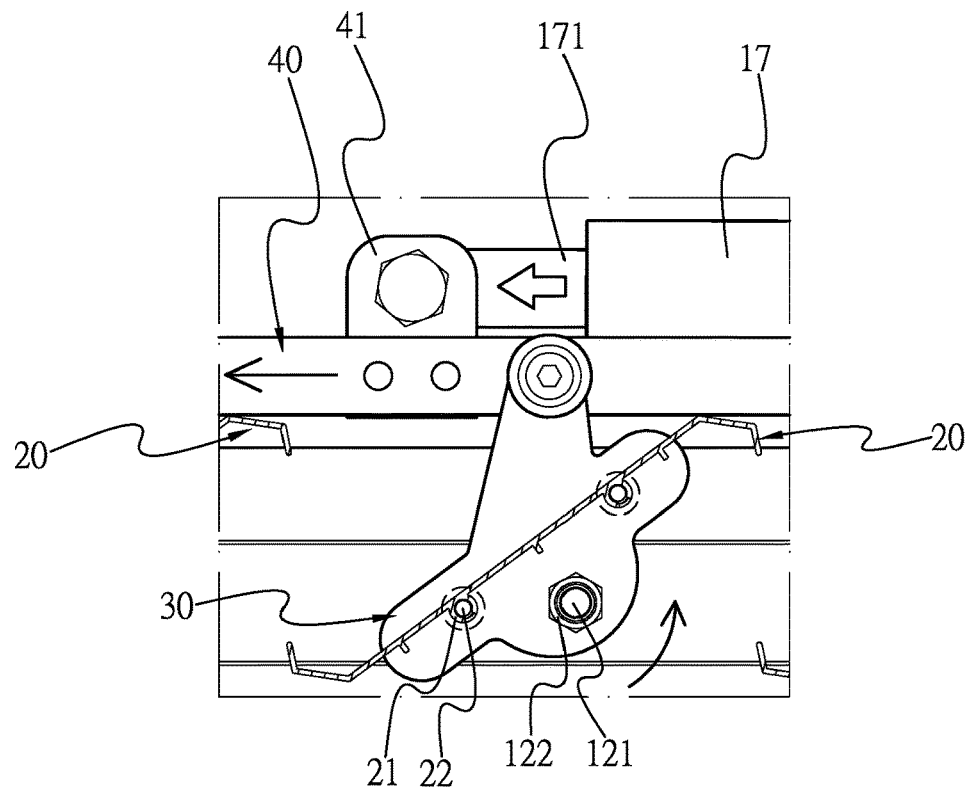
FIG. 6 shows the pull bar of the pulling device being pulled to open the louver according to the present invention.
Figure 7:
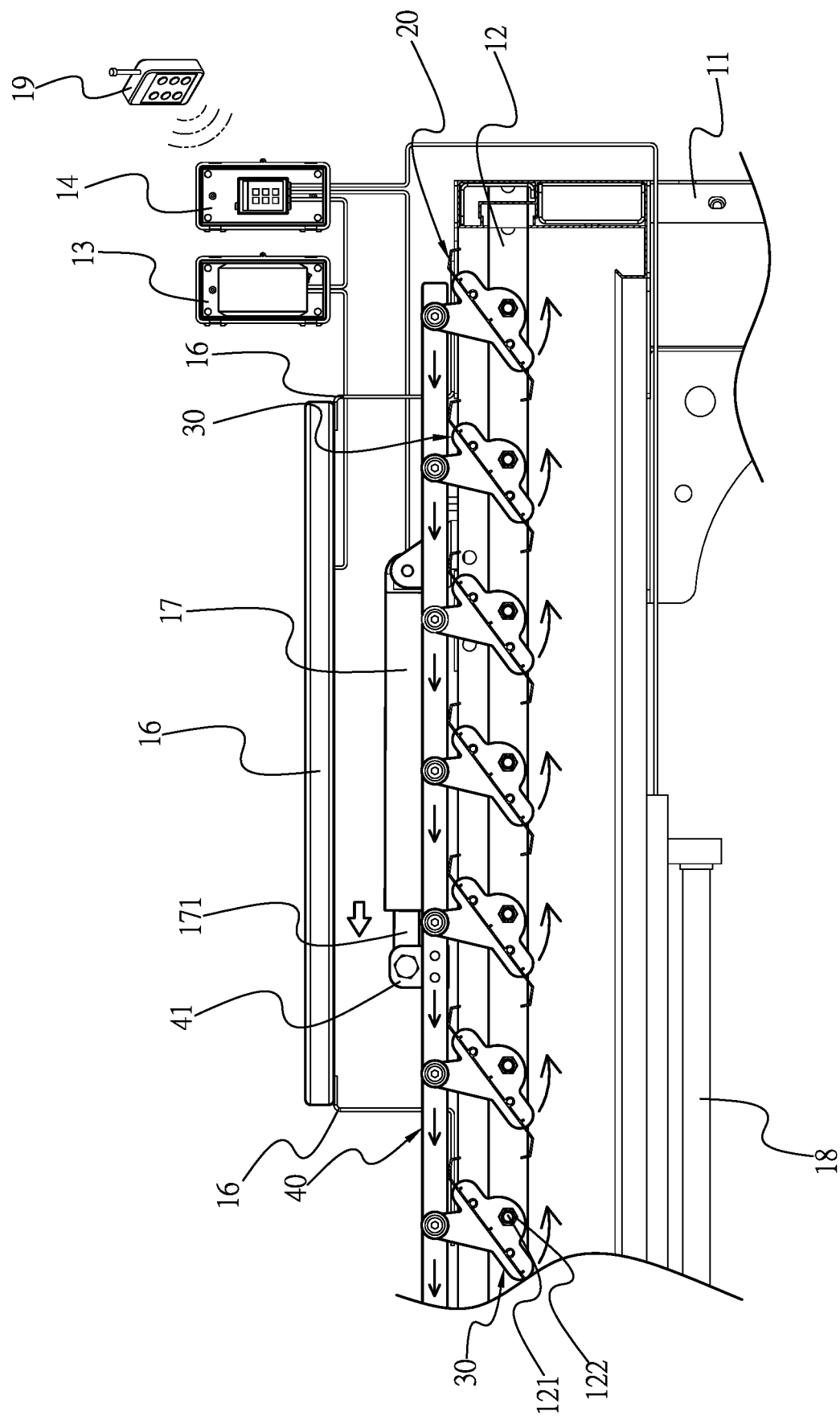
FIG. 7 shows the control device being used to close or open the louver through remote control according to the present invention.
Figure 8:
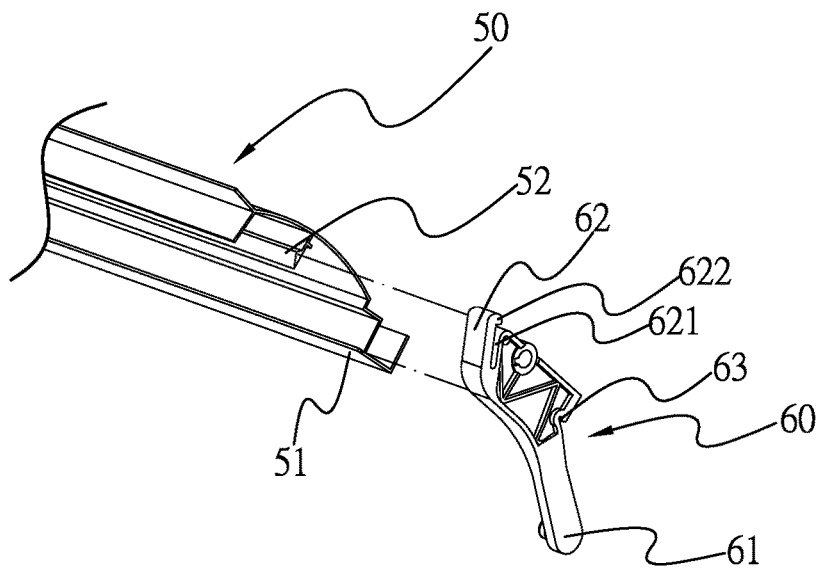
FIG. 8 is an exploded view of the louver and the louver securing member of prior art.
Figure 9:
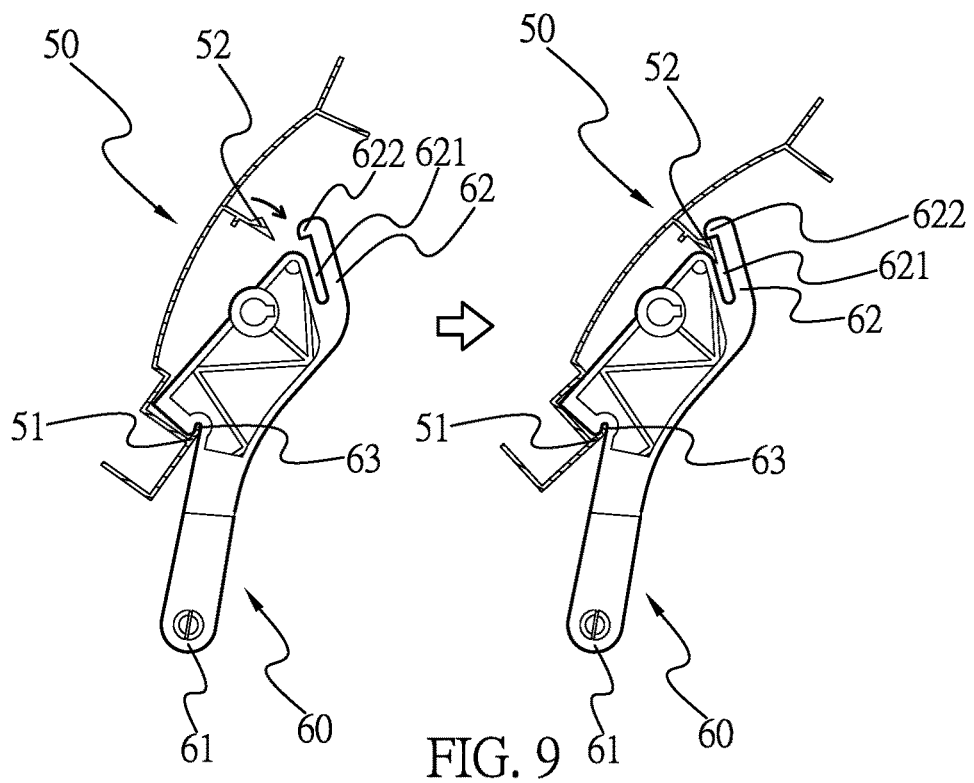
FIG. 9 shows the combination of the louver and the louver securing member according to the prior art.
Figure 10:
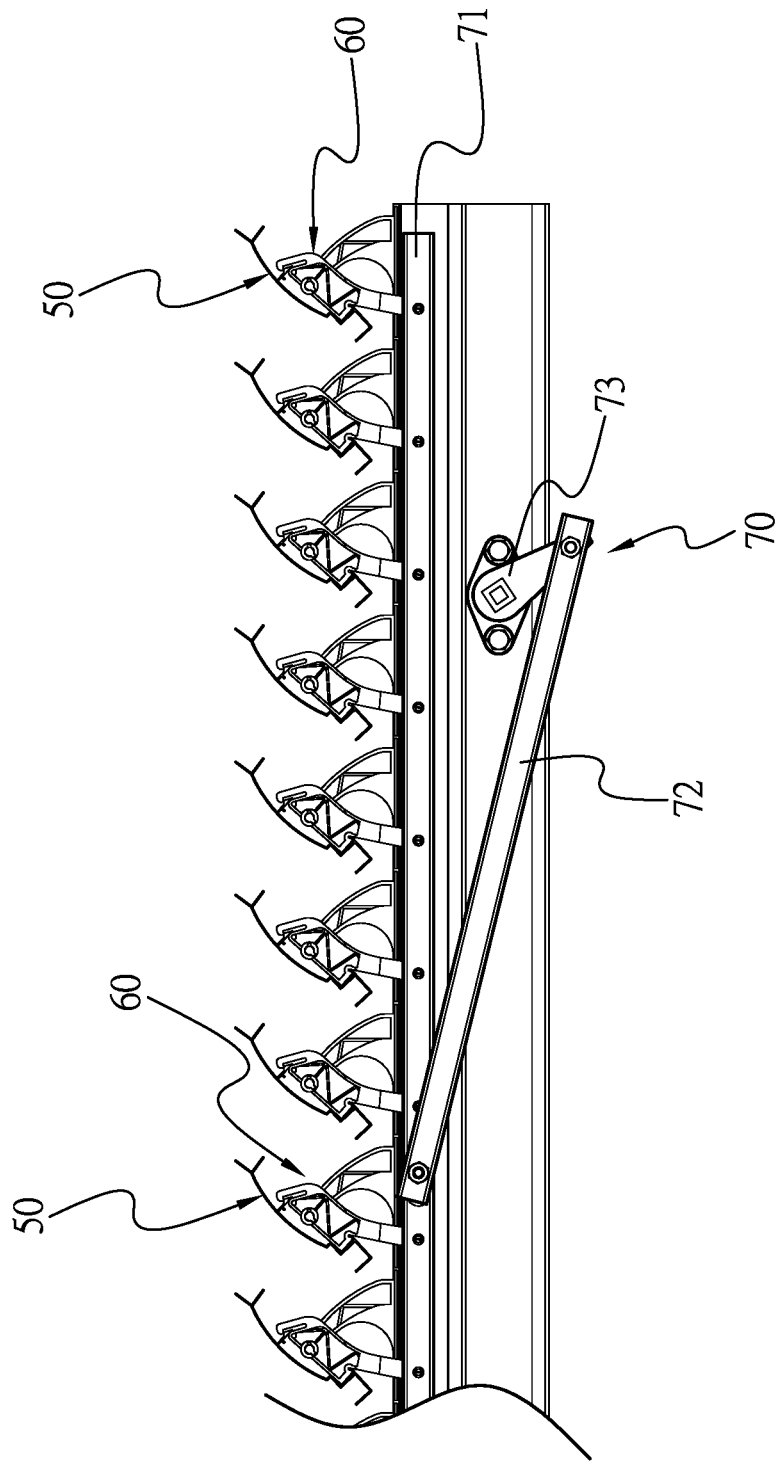
FIG. 10 is shows the louver in use according to the prior art.

In actual use, please refer to FIGS. 5 to 7, when a user wants to open the louvers 20, by operating the control device 14 to extend the pull bar 171 of the pulling device 17, and the driving members 41 drive the driving plates 40 to control the louvers 20 to open. On the other hand, when the louver 20 is to be closed, the user can operate the control device 14 to retract the pull bar 171 of the pulling device 17 to make the driving members 41 to drive the driving plates 40 to close the louvers 20.

Moreover, the crossbeam 12 further has a plurality illuminating devices 18

Furthermore, the pulling device 17 is installed below the solar panel 16.

In addition, the driving plates 40 are installed on a same side as the louvers 20 on the crossbeam 12.

Also, the driving plates 40 are installed on both sides of the crossbeam 12.

Besides, the pulling device 17 is a hydraulic cylinder.

Alternatively, the pulling device 17 is a pneumatic cylinder.

Furthermore, the control device 14 is remote controlled by a remote controller 19, as shown in FIG. 7.

In addition, the power storage device 13 and the control device 14 are integrated.

With the above structure, because the louvers 20 are locked to the louver securing members 30 by the screws 22, and the locking member 121 and the screwing member 122 are assembled on the supporting structure 10, it is less likely to fall off during operation, and its overall structural strength is also stronger. When the louvers 20 are longer in length, the middle section is less likely to sag and deform due to weight reduction, which greatly improves the durability of the structure.

Although the present invention has been explained in relation to its preferred embodiment, it is to be understood that many other possible modifications and variations can be made without departing from the spirit and scope of invention as hereinafter claimed.

What is claimed is:

1. An electric awning structure comprising: a supporting structure, a plurality of louvers each having opposite ends, a plurality of louver securing members, and a plurality of driving plates; wherein:

the supporting structure has a plurality of standing columns, and at least four crossbeams forming a frame mounted above the plurality of standing columns, the supporting structure comprising at least one power storage device and a control device;

two of the crossbeams each having sides face one another, each of the facing sides having a plurality of locking members, each of the ends of each of the louvers have at least two securing apertures each provided with a corresponding screw, a front end and rear end of each of the louver securing members respectively having a through aperture, and an upper end and lower end of each of the louver securing members respectively having a through hole and an insertion hole;

the screws pass through the through apertures of each of the louver securing members to lock the louver securing members with the securing apertures of the louvers;

the insertion hole of each of the louver securing members accepts one of the locking members of the crossbeams, the plurality of louver securing members engaging with the locking members to assemble each of the louvers between the crossbeams;

the plurality of louver securing members are connected to the driving plates via a fastener through the through holes, and each of the driving plates is connected to a driving member;

at least one solar panel is installed on the crossbeams via a bracket, the solar panel electrically connected to the power storage device connected to the control device, and the control device is connected to a pulling device;

the pulling device is mounted on the crossbeams and has a pull bar, the pull bar connected to the driving members, and the control device controls movement of the pull bar to drive the driving plates to close or open the louvers.

2. The electric awning structure as claimed in claim 1, wherein the crossbeams further comprise a plurality of illuminating devices.

3. The electric awning structure as claimed in claim 1, wherein the pulling device is installed below the solar panel.

4. The electric awning structure as claimed in claim 1, wherein the driving plates are installed on a same side as the louvers on the crossbeams.

5. The electric awning structure as claimed in claim 1, wherein the driving plates are installed on both sides of the crossbeams.

6. The electric awning structure as claimed in claim 1, wherein the pulling device is a hydraulic cylinder.

7. The electric awning structure as claimed in claim 1, wherein the pulling device is a pneumatic cylinder.

8. The electric awning structure as claimed in claim 1, wherein the control device is remote controlled.

9. The electric awning structure as claimed in claim 1, wherein the power storage device and the control device are integrated.

10. The electric awning structure as claimed in claim 1, wherein the louver securing members are locked with the driving plates via the driving plates and corresponding screws.

\* \* \* \* \*